United States Patent [19]

Marrs et al.

[11] 4,277,041

[45] Jul. 7, 1981

[54] AIRCRAFT CRUISE SPEED CONTROL SYSTEM

[75] Inventors: Graham J. Marrs, Lancaster; Richard J. Oliver, Newhall; Alfred J. Potthast, Northridge; Roland M. Samuelson, Saugus, all of Calif.

[73] Assignee: Lockheed Corporation, Burbank, Calif.

[21] Appl. No.: 941,230

[22] Filed: Sep. 11, 1978

[51] Int. Cl.³ .............................................. G05D 1/08
[52] U.S. Cl. .................................... 244/182; 364/431
[58] Field of Search ............................... 244/180–182, 244/188; 340/27 SS; 364/431, 433–435, 440, 442; 73/178 R, 178 T

[56] References Cited

U.S. PATENT DOCUMENTS

| | | | |
|---|---|---|---|
| 3,448,948 | 6/1969 | Reerink | 244/182 |
| 3,522,729 | 8/1970 | Miller | 244/182 X |
| 3,538,760 | 11/1970 | Atkey et al. | 364/431 X |
| 3,624,364 | 11/1971 | Dommasch | 244/182 X |
| 3,627,236 | 12/1971 | Hess | 244/182 |
| 3,662,976 | 5/1972 | Gesler | 364/431 X |
| 3,691,356 | 9/1972 | Miller | 244/182 X |
| 3,852,956 | 12/1974 | Martin | 364/431 X |
| 3,908,934 | 9/1975 | Schloeman | 364/431 X |
| 3,945,593 | 3/1976 | Schänzer | 364/431 X |
| 3,981,442 | 9/1976 | Smith | 364/431 |
| 4,093,158 | 6/1978 | Clews et al. | 244/182 |
| 4,144,571 | 3/1979 | Webber | 244/182 X |

OTHER PUBLICATIONS

Flight Management System and Automatic Takeoff Thrust Control System, L-1011 Tristar, paper presented 2-21-77.

Primary Examiner—J. D. Miller
Assistant Examiner—Reinhard J. Eisenzopf
Attorney, Agent, or Firm—Frederic P. Smith

[57] ABSTRACT

An improved cruise speed control system for commercial jet aircraft is described. The basic control terms for the pitch loop are altitude error, altitude rate and washed-out speed or Mach. The basic control terms for the speed loop are Mach error, Mach rate and integrated Mach error. Other speed loop functions include a gain term which increases at low engine response rates, based on either engine rpm or engine pressure ratio (EPR), to compensate for throttle linkage hysteresis, a versine term to compensate for increased drag in turns, an inner EPR loop for damping the outer speed loop, a variable gain term as a function of Mach error to facilitate changes of commanded Mach, and a switch to disconnect Mach error and Mach rate and to increase the nominal value of EPR during periods of air turbulence.

32 Claims, 3 Drawing Figures

AIRCRAFT CRUISE SPEED CONTROL SYSTEM

TECHNICAL FIELD

The invention relates to the field of control systems for aircraft and, in particular, to an aircraft cruise speed control system.

BACKGROUND OF PRIOR ART

The described apparatus is an improved cruise speed control system for commercial jet aircraft, and more specifically, is the circuit or system for using aircraft pitch as well as throttle control for maintaining the aircraft at the commanded speed.

In light of recent increases in fuel costs, airline operational economics have dictated that airplanes be flown at, or close to, their maximum specific air range cruise speeds for best fuel economy. Unfortunately, in the vicinity of this cruise speed, today's low-drag airplanes have virtually neutral speed stability; i.e. aircraft speed is very sensitive to small changes in engine thrust. It is possible to manually control the airplane speed to this optimum fuel-efficient Mach number (M), but it requires continuous attention by the flight crew to the task of throttle management. Pilots generally cannot consistently respond to this high required work load, and as a result, Mach number can vary radically from the optimum. More often, the captain simply elects to fly at a higher Mach, where the airplane is strongly speed stable but much less fuel-efficient.

More specifically, airplane and engine performance trends at typical cruise altitudes and weights show that the change in engine thrust is very small over a wide Mach number, i.e., the speed stability on thrust is essentially zero. The result is that small changes in engine thrust produce large Mach number changes, and conversely, large Mach number changes can occur at constant throttle settings.

Simple advisory systems containing engine thrust maps and airplane performance data are already on the market. These systems merely inform the pilot of the optimum flight parameters for any given flight condition. However, the pilot is still required to control speed manually (or use over-active autothrottles) and the basic problem of pilot workload, annoying thrust changes, and the associated ramifications remain.

Simple cruise autothrottle systems can be used to stabilize Mach number somewhat, but such operation is generally characterized by excessive throttle activity which is annoying to the flight crew and passengers, and may have adverse effects on engine life and fuel consumption.

The basic problem, then, which is common to all of today's modern jet aircraft and in particular jet transports, is that efficient operation requires an automatic system for more effectively maintaining aircraft speed.

SUMMARY OF THE INVENTION

In an aircraft equipped with an automatic cruise speed control system which simultaneously controls both the speed and the altitude of the aircraft, the Mach number can be adequately controlled throughout the desired speed range without the attendant undesired engine response (thrust) variations. Aircraft altitude through pitch attitude is used to control short-term variations in speed by allowing the selected altitude to vary by a small increment. The longer term changes of speed are controlled by an autothrottle loop. Through this combination of speed and altitude control, the system can maintain the selected Mach number in levels of turbulence up to that which would cause passenger discomfort.

Typical performance values are, control of aircraft speed to within 0.005 M of selected speed, engine pressure ratio (EPR, used to measure engine thrust) excursions held to within 0.01, and altitude to within 50 feet of commanded altitude in moderate turbulence and to within 100 feet in severe turbulence.

In the described embodiment, altitude error, altitude rate and washed-out Mach are the basic inputs to a pitch autopilot loop, while Mach error, Mach rate and integrated Mach error are inputs to the autothrottles. The time constants are set to apply the short-term components of the Mach term to the pitch loop to allow the pitch loop to take out short-term speed variations. The speed loop contains a Mach error integrator to control long-term speed standoffs. The speed loop also contains a variable gain term as a function of Mach error to allow for commanded speed changes, and an ERP inner loop for damping the outer speed loop with EPR rate and EPR error terms. The speed loop includes an adaptive filter which maintains a high loop gain until a significant EPR change is sensed, at which time the gain is lowered. This compensates for mechanical throttle linkage hysteresis.

A versine term is included in the speed loop to compensate for increased drag during turns. Also, a turbulence detector disconnects the Mach error and Mach rate terms to reduce throttle activity during turbulence.

It is therefore an object of the invention to provide an altitude and speed control system wherein the altitude loop contains altitude error and altitude rate terms, the speed loop contains Mach error and Mach rate terms, and cross-coupling is provided by supplying a washed-out Mach term to the pitch loop to control short-term speed variations by varying the aircraft altitude.

It is a further object to provide a variable gain term to the speed control loop to compensate for mechanical hysteresis in the throttle mechanical control linkage and engine control system.

It is a further object to add a Mach error integrator to the throttle control loop to control long-term speed standoffs.

It is a further object to add an engine pressure ratio feedback loop to provide damping in the speed control loop.

It is a further object of the invention to provide a versine term to the speed loop to compensate for speed variations induced by extra drag during turns.

It is a further object of the invention to provide a variable gain term in the speed loop to provide a higher gain for intentional transitions from one Mach number to another.

It is a further object to disconnect, by use of a turbulent air detection device, the Mach error and Mach rate terms from the speed loop to prevent excessive throttle activity in turbulent air.

These and other objects are achieved in the apparatus described below.

DETAILED DESCRIPTION OF THE PREFERRED EMBODIMENTS

Figure 1:
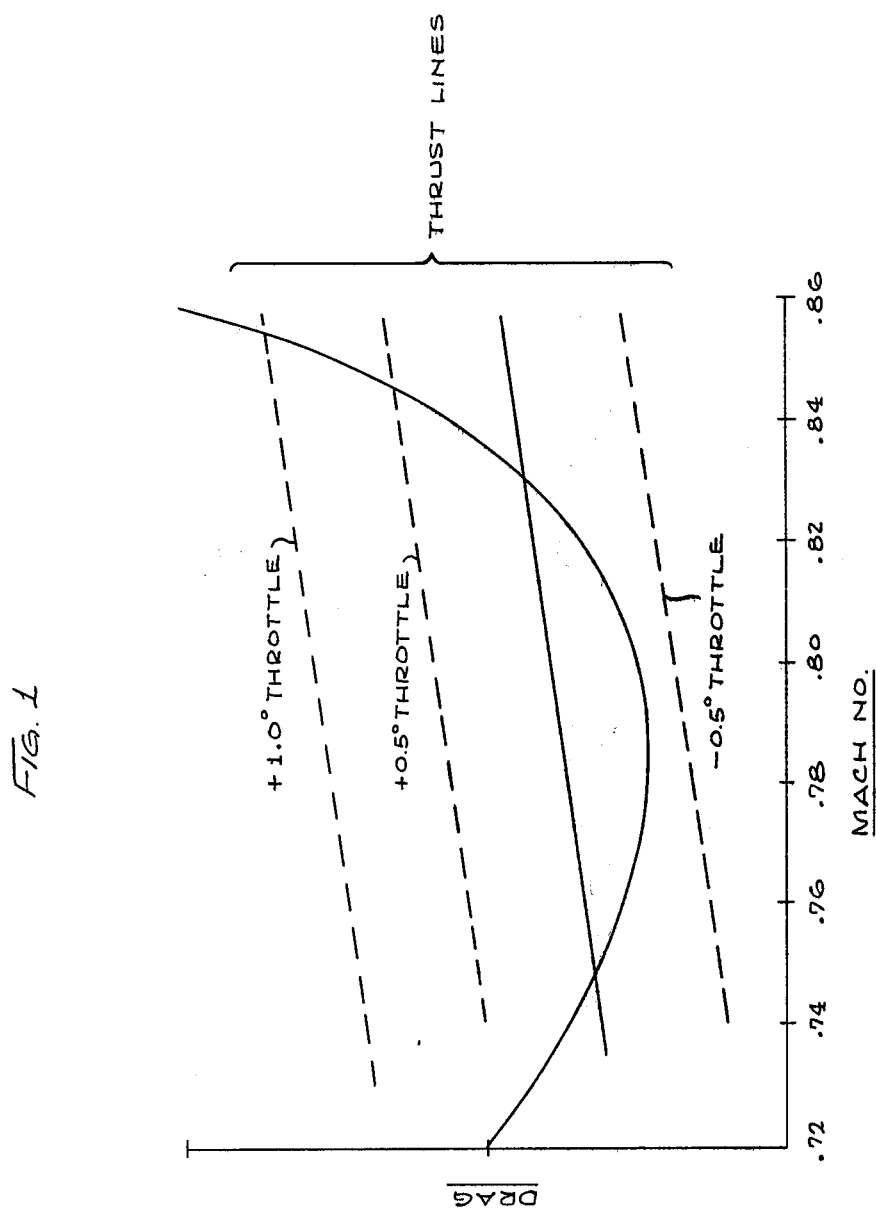
FIG. 1 is a graph of drag as a function of Mach number.

The most critical part of the optimum flight path problem is that of providing long term thrust/speed stability in the 0.80 to 0.83 Mach number region, the region where significant fuel gains can be made. FIG. 1 illustrates the relationship of drag and Mach number for a typical cruise weight and altitude. Review of this curve shows that at 0.85 Mach, a variation of plus or minus ½ degree of throttle makes a small difference (±0.01 Mach) in the speed achieved. However, at a speed of 0.83 Mach, plus or minus ½ degree throttle will vary the speed from 0.725 to 0.845, which is a large speed excursion. In fact, in the example shown, at one-half degree of reduced throttle the drag curve will never be satisfied and the speed will continue to fall off until thrust is applied. It can be seen that these large speed excursions for small thrust variations make it extremely difficult for the pilot to stabilize the speed in this region. The obvious choice is to allow the speed to creep up to 0.85 Mach where the pilot workload is considerably reduced.

An autothrottle system which only controls the throttles to achieve a stable Mach number will have the same problem as the pilot. A continuous monitoring of speed will maintain the Mach number fairly well, but the variations in EPR and throttle activity will not be acceptable because of shortened engine life, the possible voiding of the engine manufacturer's warranty, and passenger discomfort.

In order to achieve improved performance in the cruise speed control system described herein, the speed and pitch control loops are coupled by supplying a washed-out Mach term to the pitch control loop. This system is shown in block diagram form in FIG. 2. This configuration has been developed with the aid of a computer simulation of the flight characteristics of a typical commercial wide-bodied jet aircraft and the principles should apply, in general, to any aircraft.

The altitude and commanded altitude terms are subtracted in summing junction 10 to produce an altitude error term. The altitude term is also washed-out at block 11 and, after limiting the altitude error to plus 156 feet and minus 114 feet at block 12, these two terms are added in summing junction 13 to produce a basic altitude error term with a washed-out altitude or psuedo-altitude rate damping term. The basic altitude error term is subtracted at summing junction 14 with the speed term from block 18, as described below, is limited at block 15 to ±225 feet, is scaled at block 16 at 5 millivolts per foot, and is multiplied by a variable gain factor in block 17 before being applied as the input to the pitch autopilot, block 17 being controlled by the true air speed (TAS).

The term "rate" and "wash-out" in this application relate to the general mathematical form, $\tau S/(1+\tau S)$, where S is the Laplacian operator and $\tau$ is the time constant. However, rate terms generated by any method are equivalent for the purposes of the claims in this application since rate terms are routinely generated by a variety of methods and have similar properties. For instance, a rate term can be generated by a differentiating circuit which differentiates speed, a summing junction which measures the difference in speed at two points in time, or a wash-out circuit implemented in operational amplifiers, digital circuits or software.

The speed loop inputs are Mach number and commanded Mach number. These are subtracted at summing junction 22 to produce a speed error term. The signal comprising this term is lagged in block 21 and applied to summing junction 23. At the same time, the speed term is washed-out in block 19, multiplied in block 18 and applied to the pitch loop as described above, and is also washed-out in block 20 and applied to the summing junction 23, the output of which comprises a speed error term lagged to attenuate the high frequency transients, and a speed rate damping term. This output is multiplied in block 24 by a gain constant of 1.25 EPR/$\Delta$M and is again lagged in block 25. Finally, this signal is limited to ±0.15 EPR in block 26. At the same time, the output of summing junction 23 is integrated in block 27 and both of these signals are added at summing junction 28, the result being a speed error signal damped by a speed rate term and containing an integrated speed error to prevent long-term speed standoffs. The output of summing junction 28 is then multiplied by a total gain constant of 10.68 volts/EPR (15 DPS/EPR×0.712 volts/DPS) in blocks 29 and 30 and applied to the speed computer of this system, where DPS is the degrees/sec. of throttle motion.

An inner EPR loop is also provided in this system. The engine pressure ratios of all three engines are brought into the system and compared in block 31 which selects the maximum EPR for use as the input to this system. This signal is filtered in block 32 and is supplied as a damping term to summing junction 28.

Figure 2:
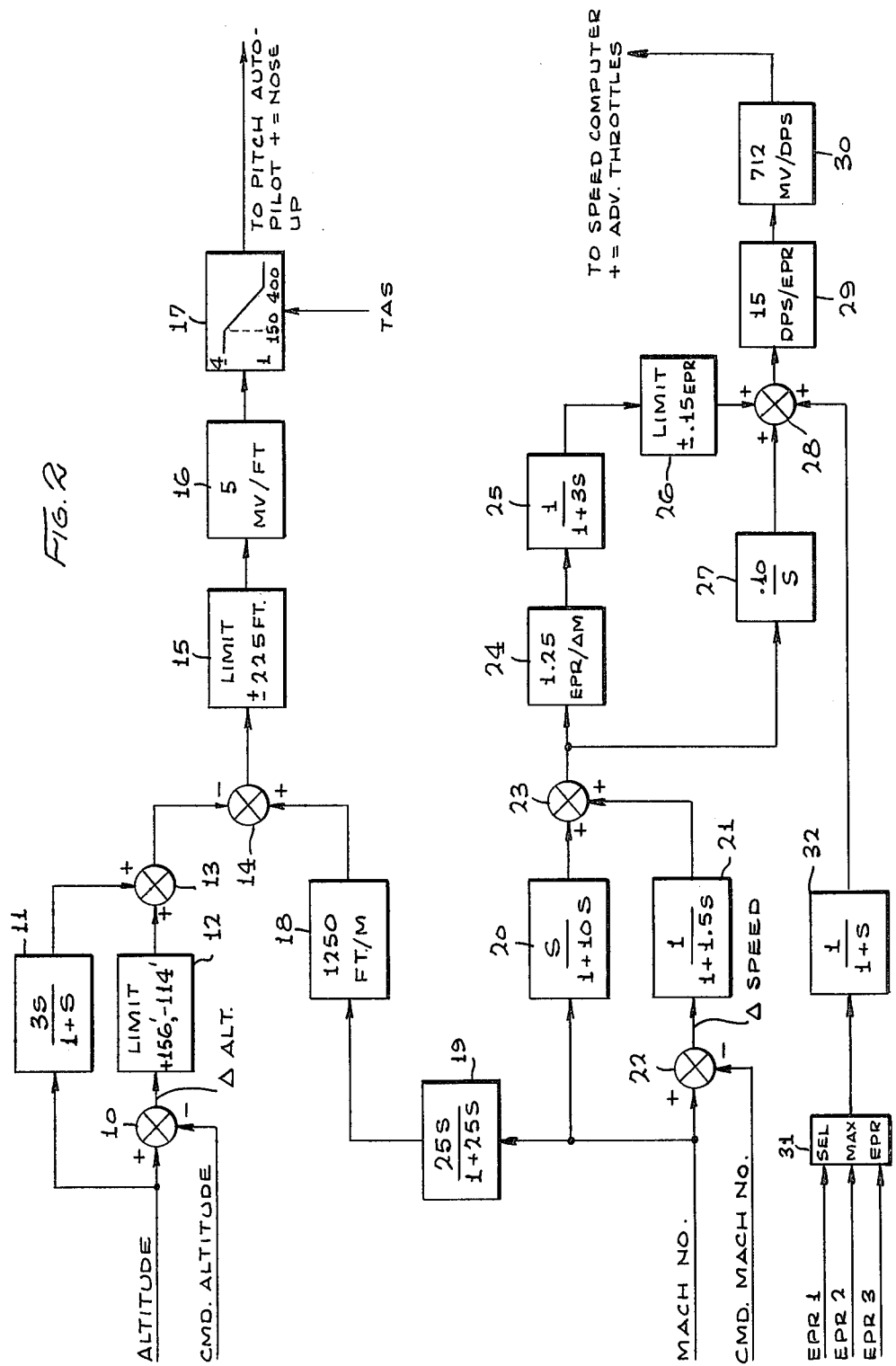
FIG. 2 is a block diagram of a cross-coupled speed control system generated by computer simulation.
Figure 3:
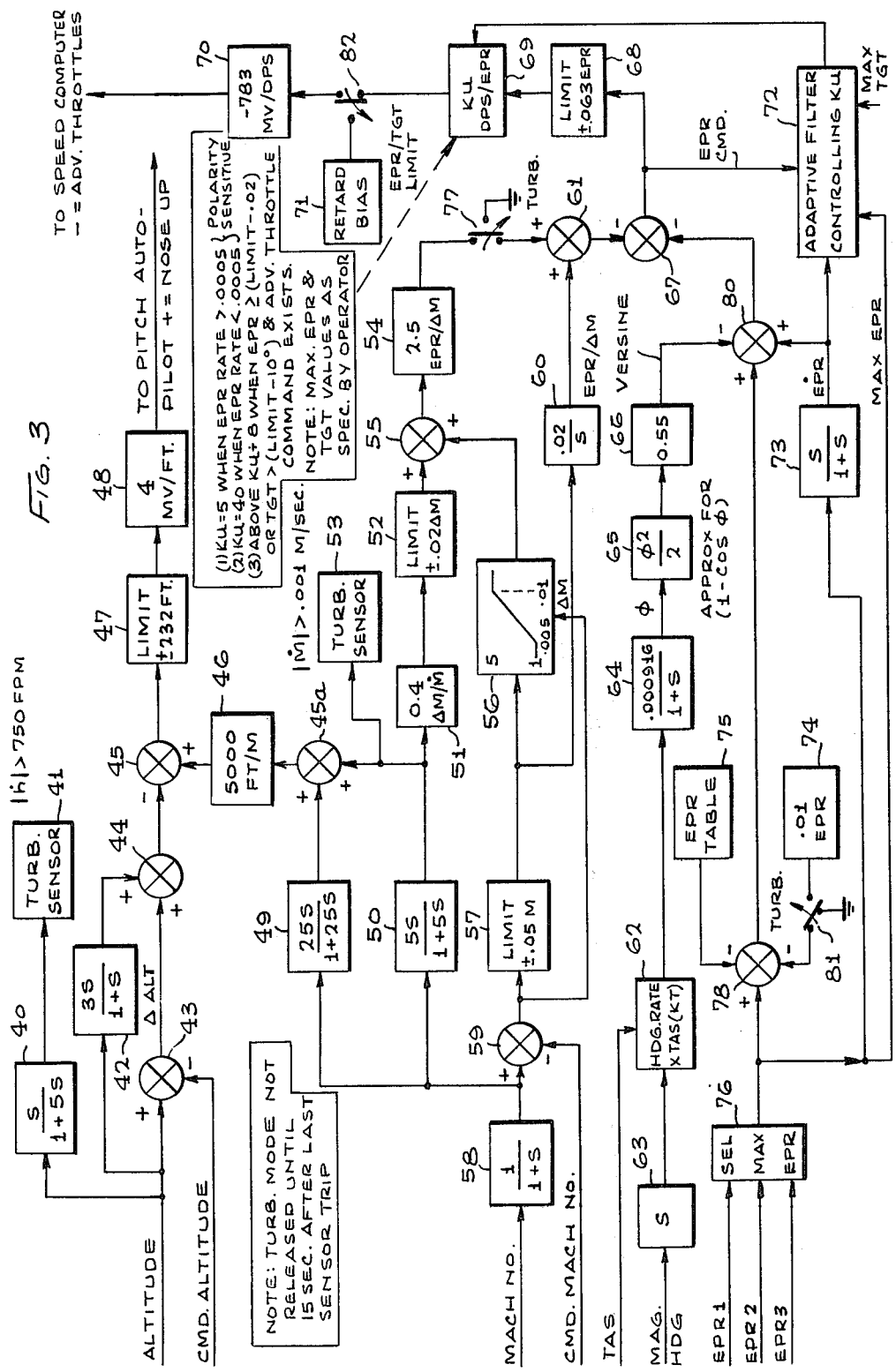
FIG. 3 is a block diagram of the cross-coupled speed control system used in a practical application, namely the Lockhead L-1011 commercial jet aircraft.

The hardware used to implement the systems of FIGS. 2 and 3 may be selected from any one of several common and readily available commercial devices suitable for the purpose. Standard instrumentation is usually available in all commercial jet transports to produce electrical signals proportional to altitude, commanded altitude, Mach number, commanded Mach number, engine response (engine pressure ratio or engine rpm), etc. The summing junctions and functional blocks may be implemented from analog circuits such as operational amplifiers configured to perform mathematical summing, logic or limiting functions. Similarly, these logic and mathematical functions may be implemented in a digital computer or hardware equivalent. Inasmuch as each of the functional units represented by the various blocks may be any one of the numerous devices for each respective function well known in the art, it is deemed unnecessary to show circuitry details. Finally, the outputs of this system are scaled in volts and can be used directly as electrical inputs to standard pitch autopilot and auto-throttle systems.

In FIG. 3 a block diagram of the cross-coupled speed control system used on the Lockheed L-1011 commercial jet aircraft is illustrated. The altitude inputs to the pitch loop are altitude and commanded altitude which are subtracted in summing junction 43 to provide an altitude error signal. An altitude rate signal is produced in block 42 and is then supplied as a damping term for the limited altitude error at summing junction 44 to provide the basic pitch loop signal. An altitude rate term is also produced at block 40 and is used by the turbulence sensor 41 to determine whether the aircraft is in turbulent air. For the purposes of this system, vertical turbulence has bee defined as an altitude rate at the output of block 40 which exceeds 750 feet per minute.

This function will be discussed in more detail hereinafter.

The cross-coupling in this system is produced by filtering the Mach number input at block 58. This signal is then washed-out at blocks 49 and 50, added in summing junction 45a and multiplied by a constant gain factor of 5000 ft/Mach in block 46 before being summed with the damped altitude error at summing junction 45. This composite signal is limited in block 47 to ±232 feet and is scaled in block 48 at 4 millivolts per foot before being applied as the input to the pitch autopilot.

The basic speed loop inputs are Mach number, lagged at block 58, and commanded Mach, which are summed at summing junction 59. This signal is then limited in block 57 and is multiplied by a variable gain factor in block 56. Block 56 is controlled by a non-limited speed error term $\Delta M$ so that at small Mach errors a low gain is provided to prevent an over-reaction of the system to a speed error, but when large differences between commanded Mach and Mach are generated, by an intentional change of commanded speed for instance, the gain of the loop will be increased to allow for the rapid acquisition of the new commanded speed. This basic speed error term is supplied through summing junction 55 and through gain block 54, comprising a 2.5 EPR/$\Delta M$ gain constant, to summing junction 61. This speed error signal is also integrated at block 60 and supplied to summing junction 61. This integrator has been included in the system to prevent long-term speed standoffs.

At the same, time the speed signal output of block 58 is applied to block 50 to produce a speed damping term. This output is multiplied at block 51 by a gain factor of 0.4 and is limited at block 52 to ±0.02 $\Delta M$ before being supplied to summing junction 55. The output of summing junction 61 therefore is the speed error damped by a speed rate term and corrected by the integrated speed error term. The output of block 50 is also applied to a second turbulence sensor 53 which is adjusted to detect horizontal turbulence exceeding 0.001 Mach per second. The outputs of turbulence sensors 41 and 53 are used at switch 77 to disconnect the Mach error and Mach rate damping terms, leaving only the integrated Mach error as an input to summing junction 61. The basis for this will be discussed hereinafter.

The output of summing junction 61 is transmitted through summing junction 67 to block 68 to where it is limited to ±0.063 EPR, is multiplied by constants at blocks 69 and 70, and is applied to the speed computer or autothrottles of the aircraft.

The adaptive filter block 72, in conjunction with the gain multiplier block 69, was necessitated by the fact that hysteresis and friction in the airplane throttle control system, compounded by engine spool-up and spool-down lags, inevitably cause unacceptable levels of limit cycling for any constant system gain and time constant factors. It is also true that improvement in the throttle control system mechanical rigging standards to reduce this engine limit cycling to acceptable levels is not realistic and an electrical solution must be provided. The solution to this problem is the provision of an "adaptive filter" which increases the speed command gain by a factor of 8 in this embodiment until the EPR feedback term confirms that the engines are responding to a given speed command, when the gain reverts to the low level necessary to insure minimal engine activity. In the test aircraft a ratio of 8 to 1 and and a threshold of 0.0005 EPR per second was found to be optimal in the reduction of throttle activity. This adaptive filter may be used in conjunction with any autothrottle system, and need not be restricted to systems where the altitude and speed channels are cross-coupled.

The EPR inner loop is shown in FIG. 3. The ratios for the three engines are applied to a selector 76 which outputs the highest value to be used as the EPR input for this loop. The speed computation loop in the preferred embodiment is also provided with a table of nominal EPR values applicable to the range of speeds, altitudes and gross weights that are likely to occur under normal flight conditions. The selected EPR from table 75 is compared against the output of EPR selector 76 to produce an EPR error signal output at summing junction 78. This EPR error signal is essentially a result of variations in drag of an individual airplane from the nominal values. It has also been found that during conditions of turbulence, as defined by turbulence sensors 41 and 43, the aircraft drag increases. This is compensated for by an increase of 0.01 EPR supplied from block 74 through a turbulence switch 81 to the summing junction 78. Finally, an EPR rate damping term is produced at block 73 and applied to summing junction 80, the output being the output of the EPR inner loop which is used as an EPR damping term input to summing junction 67.

The resultant throttle motions are so slow that they probably will not attract the pilot's attention and there is a definite possibility while using this system that engine pressure ratio, rpm, or temperature (TGT) limits could be exceeded without the pilot's being aware of it. Thus, an EPR/TGT limit switch 82 and a retard bias block 71 have been included in the preferred embodiment of the system. These limits can be varied for individual aircraft. In this embodiment a two-stage mechanization was developed. First, as the engine parameters reach a first level of EPR or TGT limit, the gain of the throttle command is reduced to 12.5% of nominal. This is to prevent overshoots that occur due to engine spool-up lag when the nominal gain is maintained to the limits. Secondly, if the EPR or TGT increases further, up to the actual limit, all throttle commands are switched out and replaced by a 0.26 degrees per second throttle rate retard bias until the EPR or TGT value reduces to the first level, when the normal speed commands are restored. This procedure has been found to give complete protection to the engines, even in heavy turbulence or when using the system to accelerate from a lower to a higher cruise Mach number.

In regard to the turbulence sensors 41 and 53, the gains and time constants of the system filters are such that, generally, rough air (short period "chop") has only a minor effect on performance. However, the phenomenon of "wave" turbulence may be encountered. These high amplitude, long period (30 to 40 seconds) horizontal or vertical air disturbances are experienced under conditions which generally arise from air mass motion over mountainous terrain. It has been found that certain embodiments of the system did not respond acceptably to these low frequency disturbances.

Since indicated Mach number cannot be controlled accurately under such conditions without unacceptable engine and altitude variations, the turbulence mode as mechanized in the embodiment of FIG. 3 has been developed. The conditions chosen to define turbulence are either a lagged Mach rate greater than 0.001 Mach per second or lagged vertical speed of greater than 750 feet per minute. Five second time constants are chosen for the above lags. When either of these criteria are met, the Mach error and Mach rate terms are switched out, leaving the very low gain Mach integral term as the only Mach reference. Since airplane drag tends to increase in disturbed air, an 0.01 EPR increment is simultaneously added to the EPR table 76 through the switch 81 from the EPR increment block 74. In this configuration the system reverts to what is essentially an EPR hold mode, and in effect, maintains a constant inertial Mach number while allowing the indicated Mach to vary freely. To prevent continually switching in and out, the mode is not release until 15 seconds after the last turbulence sensor trip. Using this embodiment of the system, throttle activity during turbulence is minimized and the thrust and Mach number are very close to trim on leaving the disturbed air.

It has been found during flight that the extra induced drag during turns resulted in speed reductions during the initial part of the turn. If the turn was extended enough this speed reduction was gradually corrected by the Mach integrator 60, but then the charged-up integrator 60 resulted in several minutes of higher than target speed when straight flight was resumed.

To counter this effect the versine term may be introduced while automatically increases the target EPR as a function of bank angle during a turn. To avoid requiring an additional bank angle input signal, bank angle is synthesized by multiplying true air speed (TAS) and magnetic heading (differentiated at block 63), two existing input signals to the navigation computer, and converted to a psuedo versine term at block 65, as shown in FIG. 3. The gain of this versine term is then optimized at blocks 64 and 66 to give zero Mach change during a 15 degree banked turn, which is the bank limit in cruise, and which is rarely exceeded during small leg changes. This term is also lagged at block 64. At higher bank angles, such as may be experienced during large leg changes, the EPR increment from the versine term overcompensates for the additional drag, such that there is a small Mach number increase to provide some additional buffet margin, particularly for high weight-/high altitude/low Mach number flight conditions.

Pursuant to the requirements of the present statutes, the principle of this invention has been explained and exemplified in a manner so that it can be readily practiced by those skilled in the art to which it pertains, or with which it is most nearly connected, such exemplification including what is presently considered to represent the best embodiments of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

INDUSTRIAL APPLICATION

The control system is useful in the control of the speed and flight profile of jet aircraft to effect fuel and cost economy.

We claim:

1. An aircraft speed control system for controlling an engine through a throttle linkage and for controlling aircraft pitch comprising:
   means for determining the speed error which is the difference between actual and commanded speed,
   means for determining the altitude error which is the difference between actual and commanded altitude,
   means for generating an altitude rate term from said actual altitude,
   means for generating a speed rate term from said actual speed,
   speed means for using the sum of the speed error and speed rate terms to control aircraft speed through said engine and throttle linkage, and
   pitch means for using the sum of altitude error, altitude rate term and speed rate term to control aircraft pitch to correct small speed errors by varying aircraft altitude.

2. The system of claim 1 further comprising means for adding the integral of the speed error to the sum of the speed error and speed rate term to control long-term speed standoffs.

3. The system of claim 2 further comprising:
   a turbulence detector, and
   a switch responsive to the turbulence detector output for disconnecting the speed error and speed rate terms from the speed means during periods of turbulence.

4. The system of claim 3 further comprising:
   means for generating an engine response rate term,
   means for storing a table of nominal engine response values for various aircraft speeds,
   means for determining the engine response error which is the difference between the nominal and actual engine response terms, and
   means for adding the engine response error and engine response rate terms to the speed means output to provide an engine response inner loop in said system.

5. The system of claim 4 further comprising means responsive to said turbulence detector for adding an increment to the nominal engine response values to compensate for higher drag during turbulence.

6. The system of claim 1 further comprising an adaptive filter means for raising the gain of the speed means when the engine response rate is low, and lowering the gain of the speed means when the engine response rate is high, to compensate for the hysteresis of the throttle linkage.

7. The system of claim 1 further comprising means for generating a versine term and for adding it to the output of the speed means to compensate for increased drag in turns.

8. The system of claim 1 further comprising:
   means for generating an engine response rate term,
   means for storing a table of nominal engine response values for various aircraft speeds,
   means for determining the engine response error which is the difference between the nominal and actual engine response terms, and
   means for adding the engine response error and engine response rate terms to the speed means output to provide an engine response inner loop in said system.

9. The system of claim 1 further comprising means for providing a higher gain for the speed error term during periods of large speed error to allow for a change in commanded speed.

10. In an aircraft speed control system for controlling an engine through a throttle linkage and for controlling aircraft pitch comprising an autopilot responsive to aircraft altitude for controlling pitch, and an autothrottle responsive to commanded aircraft speed for controlling said engine, the improvement comprising:

pitch rate means for coupling an altitude error term, which represents the difference between actual and commanded altitude, and an altitude rate term to said autopilot, and speed rate means for adding a speed error term, which represents the difference between actual and commanded speed, to said autothrottle and a speed rate term derived from said aircraft speed simultaneously to said autopilot and autothrottle to correct small speed errors by varying aircraft altitude.

11. The system of claim 10 further comprising means for computing the speed error as a difference between commanded and actual speed, for integrating said speed error, and for coupling said speed error integral to said autothrottle to control long-term speed standoffs.

12. The system of claim 11 further comprising an adaptive filter means for raising the gain of said autothrottle when the engine response rate is low and lowering the gain of said autothrottle when the engine response rate is high, to compensate for the hysteresis of the engine throttle linkage.

13. The system of claim 11 further comprising:
a turbulene detector, and
a switch responsive to said turbulence detector output for disconnecting the aircraft speed and speed rate inputs to said autothrottle.

14. The system of claim 13 further comprising:
means for generating an engine response rate term,
means for storing a table of nominal engine response values for various aircraft speeds,
means for determining the engine response error which is the difference between the nominal and actual engine response term, and
means for adding the engine response error and engine response rate terms to said autothrottle output.

15. The system of claim 14 further comprising means responsive to said turbulence detector for adding an increment to the engine response values to compensate for higher drag during turbulence.

16. The system of claim 10 further comprising:
means for generating an engine response rate term,
means for storing a table of nominal engine response values for various aircraft speeds,
means for determining the engine response error which is the difference between the nominal and actual engine response term, and
means for adding the engine response error and engine response rate terms to said autothrottle output.

17. The system of claim 10 further comprising means for providing a higher gain factor for said speed rate means during periods of large speed error to allow for a change of commanded speed.

18. The method of controlling the speed of an aircraft having a pitch autopilot and an engine controlled through a throttle linkage of an autothrottle comprising the steps of:

controlling the autothrottle with an electrical input signal which is a function of speed error, derived by differencing actual and commanded speed, and speed rate derived from the speed of said aircraft, and controlling the pitch autopilot with an electrical input signal which is a function of the altitude error, derived by differencing actual and commanded altitude, altitude rate and said speed rate to correct small speed errors by varying aircraft altitude.

19. The method of claim 18 further comprising the step of adding to the autothrottle input an additional signal proportional to the integral of speed error.

20. The method of claim 19 further comprising the step of disconnecting the speed error and speed rate inputs to the autothrottle when air turbulence is detected.

21. The method of claim 20 further comprising the step of adding to the autothrottle signals an additional signal proportional to the sum of engine response rate and the difference of actual engine response from its nominal value to provide said autothrottle with an engine response inner loop.

22. The method of claim 21 further comprising the step of increasing the nominal value of engine response when air turbulence is detected to compensate for increased drag during turbulence.

23. The method of claim 18 further comprising the step of increasing the magnitude of the autothrottle output signal at low levels of engine response rate, and decreasing the magnitude of the autothrottle output signal at high levels of engine response rate to compensate for the hysteresis of the throttle linkage.

24. The method of claim 18 further comprising the steps of generating a versine term snd adding it to the autothrottle input signal to compensate for increased drag in turns.

25. The method of claim 18 further comprising the step of adding to the autothrottle output signal an additional signal proportional to the sum of engine response rate and the difference of actual engine response from its nominal value.

26. The method of claim 18 further comprising the step of varying the gain of the speed error term as a function of the speed error to allow for a change in commanded speed.

27. An aircraft speed control system for controlling an engine through a throttle linkage comprising:
means for determining the speed error which is the difference between actual and commanded aircraft speed,
means for generating a speed rate term from said actual speed,
speed means for using the sum of said speed error and speed rate terms to control aircraft speed through said throttle linkage and engine, and
an adaptive filter means for raising the gain of the speed means when the engine response rate is low, and lowering the gain of the speed means when the engine response rate is high, to compensate for the hysteresis of said throttle linkage.

28. The system of claim 27 further comprising means for adding the integral of the speed error to the sum of the speed error and speed rate terms to control long-term speed standoffs.

29. The system of claim 27 wherein said speed means further uses an additional signal proportional to the integral of speed error to control long-term speed standoffs.

30. The method of controlling the speed of an aircraft having an autothrottle for controlling an engine through a throttle linkage, said method comprising:
controlling the autothrottle with an electrical input signal proportional to the sum of speed error, which is the difference between actual and commanded speed, and speed rate, and increasing the magnitude of the autothrottle output signal at low levels of engine response rate, and decreasing the magnitude of the autothrottle output signal at high levels of engine response rate, to compensate for the hysteresis of the throttle linkage.

31. In an aircraft speed control autothrottle responsive to aircraft speed for controlling an engine through a throttle linkage, the improvement comprising an adaptive filter means for raising the gain of said autothrottle when the engine response rate to a throttle change is low, and lowering the gain of the autothrottle when the engine response rate to a throttle change is high, to compensate for the hysteresis of the engine throttle linkage.

32. The autothrottle of claim 31 further comprising means for generating a speed rate term and coupling said speed rate term to said autothrottle, said autothrottle responsive to said speed rate term for controlling said aircraft speed.

* * * * *